(12) United States Patent
Katsuta et al.

(10) Patent No.: US 11,798,410 B2
(45) Date of Patent: Oct. 24, 2023

(54) TRAFFIC FLOW CONTROL SYSTEM, TRAFFIC FLOW CONTROL PROGRAM, TRAFFIC FLOW CONTROL METHOD, AND TRAVELING CONTROLLER

(71) Applicant: HITACHI, LTD., Tokyo (JP)

(72) Inventors: Keiichi Katsuta, Tokyo (JP); Junya Takahashi, Tokyo (JP); Takehito Ogata, Tokyo (JP); Wataru Tanaka, Tokyo (JP); Mariko Mizuochi, Tokyo (JP); Kentaroh Maki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/636,434

(22) PCT Filed: May 15, 2020

(86) PCT No.: PCT/JP2020/019509
§ 371 (c)(1),
(2) Date: Feb. 18, 2022

(87) PCT Pub. No.: WO2021/033378
PCT Pub. Date: Feb. 25, 2021

(65) Prior Publication Data
US 2022/0284809 A1 Sep. 8, 2022

(30) Foreign Application Priority Data
Aug. 22, 2019 (JP) .................................. 2019-152240

(51) Int. Cl.
*G08G 1/08* (2006.01)
*G08G 1/09* (2006.01)

(52) U.S. Cl.
CPC .............. *G08G 1/08* (2013.01); *G08G 1/091* (2013.01)

(58) Field of Classification Search
None
See application file for complete search history.

(56) References Cited

U.S. PATENT DOCUMENTS

| 6,188,326 B1 * | 2/2001 | Flick ................. G07C 9/00857 340/12.55 |
| 2002/0000920 A1 * | 1/2002 | Kavner ................ G08G 1/0104 340/936 |

(Continued)

FOREIGN PATENT DOCUMENTS

| CN | 109712422 A | 5/2019 |
| CN | 110049575 A * | 7/2019 ............ H04W 4/026 |

(Continued)

OTHER PUBLICATIONS

International Search Report of PCT/JP2020/019509 dated Aug. 4, 2020.

(Continued)

*Primary Examiner* — Fekadeselassie Girma
(74) *Attorney, Agent, or Firm* — MATTINGLY & MALUR, PC

(57) ABSTRACT

In a traffic flow control system, communication is performed with a travel control device of a moving body passing through a transportation route and the traffic flow of the transportation route is controlled. The traffic control system includes an entry authority management unit and a communication unit. In a transportation route divided into virtual areas, the entry authority management unit manages entry authority for each area, managing tokens in a number that corresponds to the area, and guiding entry of the moving body to the area by attaching entry authority to a token and delivering the resulting token to the travel control device. The communication unit communicates the entry authority and tokens to the travel control device.

8 Claims, 17 Drawing Sheets

(56) References Cited

U.S. PATENT DOCUMENTS

| | | | |
|---|---|---|---|
| 2006/0250250 A1* | 11/2006 | Youn | G06K 19/07786 |
| | | | 340/572.7 |
| 2011/0234423 A1 | 9/2011 | Edwardson et al. | |
| 2012/0109796 A1* | 5/2012 | Mashal | G06Q 50/30 |
| | | | 705/34 |
| 2019/0051166 A1 | 2/2019 | Bronk | |

FOREIGN PATENT DOCUMENTS

| | | |
|---|---|---|
| EP | 2 858 039 A1 | 4/2015 |
| JP | 2007-286994 A | 11/2007 |
| JP | 2007-293388 A | 11/2007 |
| JP | 2014-048732 A | 3/2014 |
| JP | 2016-153987 A | 8/2016 |
| JP | 2017-027175 A | 2/2017 |
| WO | 2011/119788 A1 | 9/2011 |
| WO | WO-2016072247 A1 * 5/2016 | ............. G06Q 40/02 |

OTHER PUBLICATIONS

Kurt Dresner and P. Stone, "A Multiagent Approach to Autonomous Intersection Management", Journal of Artificial Intelligence Research, vol. 31, No. 1, pp. 591-656, 2008.

J. Lee and B. Park, "Development and Evaluation of a Cooperative Vehicle Intersection Control Algorithm under the Connected Vehicles Environment", IEEE Transactions on Intelligent Transportation Systems, vol. 13, No. 1, pp. 81-90, Mar. 2012.

Extended European Search Report received in corresponding European Application No. 20853944.5 dated Jul. 10, 2023.

\* cited by examiner

TRAFFIC FLOW CONTROL SYSTEM, TRAFFIC FLOW CONTROL PROGRAM, TRAFFIC FLOW CONTROL METHOD, AND TRAVELING CONTROLLER

TECHNICAL FIELD

The present invention relates to a traffic flow control system, a traffic flow control program, a traffic flow control method, and a traveling controller.

BACKGROUND ART

As a method of controlling a group of vehicles at an intersection, an autonomous intersection management method (AIM) (see Nonpatent Literature 1), and a cooperative vehicle intersection control method (CVIC) (see Nonpatent Literature 2) have been known.

The autonomous intersection management method is a method where an intersection is divided into fine cells, and an occupation right of each cell is managed on a time basis. In the method, in response to a passing permission request from a vehicle, it is determined whether or not the vehicle can pass corresponding to whether or not other vehicles occupy an approaching lane that the vehicle intends to pass, and the group of vehicles is controlled by returning the result of determination.

The cooperative vehicle intersection control method is a method where traveling trajectories of all vehicles entering an intersection are predicted, and speeds of respective vehicles are controlled so as to exclude a possibility of collision.

CITATION LIST

Nonpatent Literature

Nonpatent Literature 1: "K. Dresner and P. Stone, "A multiagent approach to autonomous intersection management", Journal of Artificial Intelligence Research, vol. 31, No. 1, pp. 591 to 656, 2008
Nonpatent Literature 2: J. Lee and B. Park, "Development and evaluation of a cooperative vehicle intersection control algorithm under the connected vehicles environment", IEEE Transactions on Intelligent Transportation Systems, vol, 13, no. 1, pp. 81-90, 2012

SUMMARY OF INVENTION

Technical Problem

In both the autonomous intersection management method and the cooperative vehicle intersection control method, an apparatus on a ground side that controls a traffic flow is required to acquire, at a high speed and with high frequency, from devices mounted on all vehicle that travel at an intersection, detailed positional information of the vehicles, speed information, information of traveling courses that the vehicles intend to travel, and the like, and to calculate appropriate entering timings to an intersection, and appropriate traveling speeds.

Accordingly, the apparatus on a ground side that controls a traffic flow is required to possess a high computer performance, and a communication system between the apparatus on a ground side and the devices mounted on the vehicle is required to possess a high-speed and large-capacity communication performance. Accordingly, technically, it has been technically difficult to control the traffic flow.

In view of the abovementioned circumstances, it is an object of the present invention to provide a technique that controls a traffic flow.

Solution to Problem

To achieve the abovementioned object, a typical example of a traffic flow control system according to the present invention is a traffic flow control system that performs communication with a traveling controller of a moving body traveling on a traffic path and controls a traffic flow of the traffic path, wherein the traffic flow control system includes an entering right control unit and a communication unit.

The entering right control unit, in the traffic path that is divided into virtual areas, controls an entering right for each of the areas, controls tokens the number of which corresponds to the number of the areas, and guides entering of the moving body to the area by giving the token to the traveling controller in a form that the entering right is attached to the token.

The communication unit performs communication of the entering right and the token between the communication unit and the traveling controller.

Advantageous Effects of Invention

The present invention provides a technique that controls a traffic flow.

Other objects, configurations and advantageous effects will become more apparent by the description of embodiments described hereinafter.

BRIEF DESCRIPTION OF DRAWINGS

FIG. 2 is a view for describing steps when a vehicle 2a enters an area a.
FIG. 3 is a view for describing steps after the vehicle 2a enters the area a.

DESCRIPTION OF EMBODIMENTS

Figure 1:
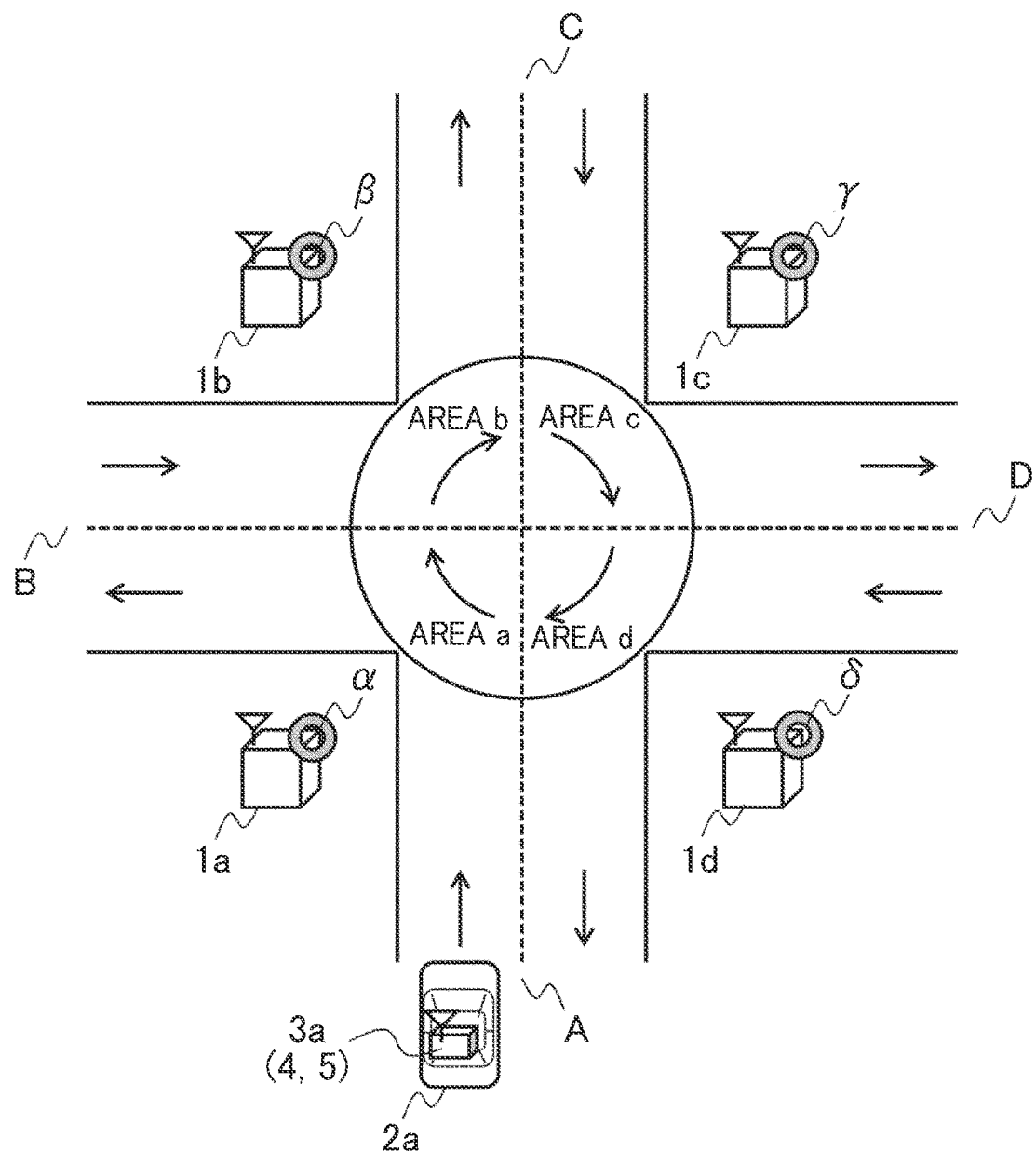
FIG. 1 is a configurational view of a traffic control system according to a first embodiment.

According to one embodiment, there is provided a traffic flow control system that performs communication with a traveling controller of a vehicle (corresponding to a moving body) traveling on a control object road (corresponding to a traffic path) and controls a traffic flow of the control object road to be controlled. The traffic flow control system includes an entering right control unit and a communication unit.

The control object road is divided into a plurality of areas for controlling a traffic flow, and the entering right control unit controls an entering right for each area. A plurality of tokens number of which correspond to the number of areas (preferably the same number as the areas) are prepared. An entering right to each area is given to a traveling controller of a vehicle that travels on the control object road, and is given in a form that the right is attached to the token. That is, the abovementioned configuration realizes a system that prevents the occurrence of a situation where a plurality of competitive vehicles in use of an approaching lane from simultaneously entering the same area using an entering right to the area, and restricts the total number of vehicles that can enter the control object road based on the number of tokens.

The traveling controller of the vehicle requests, at an entrance of an area where the vehicle intends to travel, an entering right to the area to an entering right control unit in charge of the area. The traveling controller of the vehicle, after the entering right is given, allows the vehicle to enter the area while paying attention to a preceding vehicle or an obstacle.

Instead of using an entering right, a traffic flow may be controlled by avoiding the collision of vehicles using the concept of an occupation right used in an autonomous intersection management method described in the Background, in other words, a system that always allows only one vehicle or less in a cell. However, in such a case, it is necessary to ensure a space having a distance necessary for avoiding the collision between a vehicle and a vehicle that pass an intersection (at least a space having a distance that is a combination of a length of a cell and a braking distance of a vehicle). Accordingly, the number of vehicles that pass an intersection per unit time is limited to a small number.

In view of the above, in this embodiment, on a premise that techniques for detecting an obstacle ahead of a vehicle such as a technique that avoids the collision by detecting a preceding vehicle (known techniques proposed with respect to this technique), a collision avoiding technique of a driver, and the like are used in combination of the technique of the present invention, a traffic flow is controlled using the concept of entering right (a right on qualification that allows a moving body to approach an area) instead of an occupation right (an exclusive use right that excludes entering of other moving bodies into an area).

Hereinafter, specific embodiments are described with reference to attached drawings. With respect to the configuration described later where a plurality of entering right control terminals of the same type exist such as entering right control terminals 1a to 1d, in a case where it is unnecessary to limit the entering right control terminals to particular numbers, the description may be made by omitting symbols for the sake of brevity.

First Embodiment

In the first embodiment, as one mode for carrying out the traffic flow control method according to the present invention, a control method is described where an intersection formed of a left-side-passing four-way junction is a control object. Assuming that vehicles travel in a rightward turning direction (in a clockwise direction as viewed from above) inside an intersection in a roundabout manner, the inside of the intersection is divided into a plurality of areas as units for controlling entering rights.

In the first embodiment, as illustrated in FIG. 1, the intersection is divided into four areas where each area extends from an entrance of the area connected to a road to an exit to a next road in a rightward turning direction, and the respective areas are referred to as an area a, an area b, an area c, and an area d hereinafter.

In such a configuration, a vehicle entering route to each area is formed of two routes including a route from the area on a front side and a route from a road to which the route is connected. On the other hand, a vehicle exiting route from each area is formed of two routes including a route to the next area and a route to a road to which the route is connected. For example, the vehicle entering route to the area a is formed of two routes including the route from the area d and the route from the road A, and the vehicle entering route from the area a is formed of two routes including the route to the area b and the route to the road B.

The entering right control terminals 1a to 1d that are arranged corresponding to respective areas are in charge of the entering rights to the respective areas. These entering right control terminals 1a to 1d are formed by arranging the advancing control unit and the communication unit described previously in a dispersed manner as terminal devices (actual devices or virtual device objects on a program) in charge of the areas.

In the first embodiment, the entering rights for respective areas a to d are controlled by the entering right control terminals 1a to 1d respectively.

These four entering right control terminals 1a to 1d, as a whole, control four tokens α, β, γ, δ.

In an initial state where the vehicle does not enter the intersection, each of entering right control terminals has one token.

When the entering right control terminal in charge of a certain area receives a request of an entering right from the traveling controller of a vehicle that intends to travel to the area, the entering right control terminal in charge of the area transmits a token to which an entering right to the area is attached to the traveling control device.

Thereafter, this entering right control terminal holds the entering right even when the entering right control terminal receives the request of the entering rights from the traveling controllers of other vehicles until the entering right is returned, and does not give the entering right.

Further, the entering right control terminal cannot give the entering right if the token does not exist even when the entering right control terminal receives the return of the entering right.

That is, only when the entering right control terminals 1a to 1d do not give the entering right to any vehicles and the entering right control terminals 1a to 1d possess the tokens at this point of time, the entering right control terminal can give the entering right to the vehicle that has requested the entering right.

On the other hand, when the vehicle intends to approach the area, the traveling controller of the vehicle requests an entering right to the entering right control terminal in charge of the area at the entrance of the area. Then, when the traveling controller receives a token to which the entering right to the area is attached (that is, when the entering right to the area is given), the traveling controller allows the vehicle to approach the area while paying attention to a preceding vehicle or an obstacle inside of the area.

The traveling controller, after the vehicle enters the area, returns the entering right to the entering right control terminal in charge of the area, and returns the token to the entering right control terminal in charge of the next area.

However, at this stage, when the vehicle does not intend to exit to the road connected to the area but intends to enter the next area, the traveling controller attaches a reservation right to the token to be returned and transmits the token attached with the reservation right, and requests an entering right to the next area simultaneously.

To prevent places where the token is given from being concentrated, the distribution of the tokens is adjusted among the entering right control terminals 1a to 1d at suitable timing. That is, the entering right control terminal, excluding a case where both tokens are tokens with the reservation right, each entering right control terminal does not possess two or more tokens simultaneously, and transfers the token with no reservation right to other entering right control terminals when necessary.

To describe more specifically, in a case the entering right control terminal possesses another token when the token is returned, the entering right control terminal transfers this token to the entering right control terminal of the next area. Further, in a case where the entering right control terminal to which the token is transferred possesses another token at the time of receiving the token, the entering right control terminal transfers this token to the entering right control terminal of the next area. Accordingly, the tokens always circulate among the entering right control terminals without being distributed in a concentrative manner.

Further, in a case where the token to which the reservation right is attached is returned to the entering right control terminal, the entering right control terminal, provided that the entering right control terminal has not yet given the entering right to another vehicle at this point of time, attaches the entering right to the area to the token and transmits the token to the traveling controller of the vehicle possessing the reservation right.

In a case where the entering right has already been given to another vehicle and has not been returned yet, although the entering right control terminal holds a request for the entering right, the entering right control terminal prioritizes such a request to requests from other entrances. Then, at a point of time that the entering right is returned, the entering right control terminal attaches the entering right to the area to the token attached with the reservation right, and transmits the token attached with the reservation right to the traveling controller of the vehicle possessing the reservation right.

In this manner, the traffic flow control system realizes the function "with respect to the vehicle that once enters any one of the areas a to d, when the vehicle intends to enter another area disposed adjacent to the area, the entering right to another area disposed adjacent to the area is automatically reserved". As a result, compared to vehicles outside the areas a to d, the entering right is given to the vehicles inside the areas a to d with priority. Accordingly, the vehicles inside the areas a to d advance in a roundabout manner without a delay and hence, it is possible to make the vehicles inside the areas a to d exit from the region outside the areas a to d.

As a result, in the areas a to d that are liable to become an obstacle (so-called a neck) in a traffic flow, the delay of the vehicles is reduced and hence, a traffic flow of the vehicles heading toward the intersection becomes smooth. Accordingly, a traffic flow at the intersection and a traffic flow around the intersection become smooth as a whole.

Further, in the first embodiment, a traffic flow is not controlled by an exclusive control based on an occupying right (an exclusive right that excludes the entering of other moving bodies to the area). That is, in the first embodiment, a traffic flow is controlled by a control where an entering right (a qualification right that allows a moving body to enter an area) is given, the entering right is not given to other vehicles until the entering right is returned. With respect to a vehicle to which the entering right is given, a driver or a traveling controller (a drive assist mechanism, a safety brake mechanism, an automatic driving mechanism, and the like) determines a road situation in an autonomic manner. Accordingly, at points of time before and after giving an entering right to a vehicle, a traveling speed and an inter-vehicle distance necessary for avoiding a collision are guaranteed by a vehicle side as its responsibility. On such a premise, it is not necessary for a traffic flow control system side to acquire detailed positional information of the vehicle, speed information, information of a traveling course on which the vehicle intends to travel, and the like at a high speed and with high frequency. It is also not necessary for a traffic flow control system side to give an instruction to each vehicle by calculating an appropriate vehicle distance and an appropriate traveling speed at an intersection. Further, it is unnecessary for a device side to possess high calculation performance and a high-speed and large-capacity communication performance that are conventionally necessary in the traffic flow control system from the devices mounted on all vehicles which travel in the intersection. Accordingly, technical difficulty existing in a control of a traffic flow can be reduced.

The functions of the traffic control system according to this embodiment have been described heretofore.

A manner of operations of the entering right control terminals 1a to 1d and the traveling controller of the vehicle, and the behaviors of the tokens in the first embodiment are described in further detail by taking up an example of a case where a vehicle 2a enters the intersection illustrated in FIG. 1 from the road A, and exits to the road C.

A traveling controller 3a is mounted on the vehicle 2a. The traveling controller 3a includes: a moving body communication unit 4 configured to perform communication between the moving body communication unit 4 and the traffic flow control system; and a moving body control unit 5 configured to perform a control (for example, an automatic stop control, a traveling assist from deceleration to a temporary stop, automatic holding of a temporary stop state, guiding of a path for temporary stop, an instruction of alarm for temporary stopping, and the like) for preventing the vehicle 2a that intends to enter the area from entering the area until an entering right to the area is given from the traffic flow control system.

Entering rights to the areas a, b, c, d are respectively controlled by the entering right control terminals 1a, 1b, 1c, 1d. Further, it is assumed that, in an initial state, the entering right control terminals 1a, 1b, 1c, 1d have the tokens α, β, γ, δ respectively.

Figure 2:
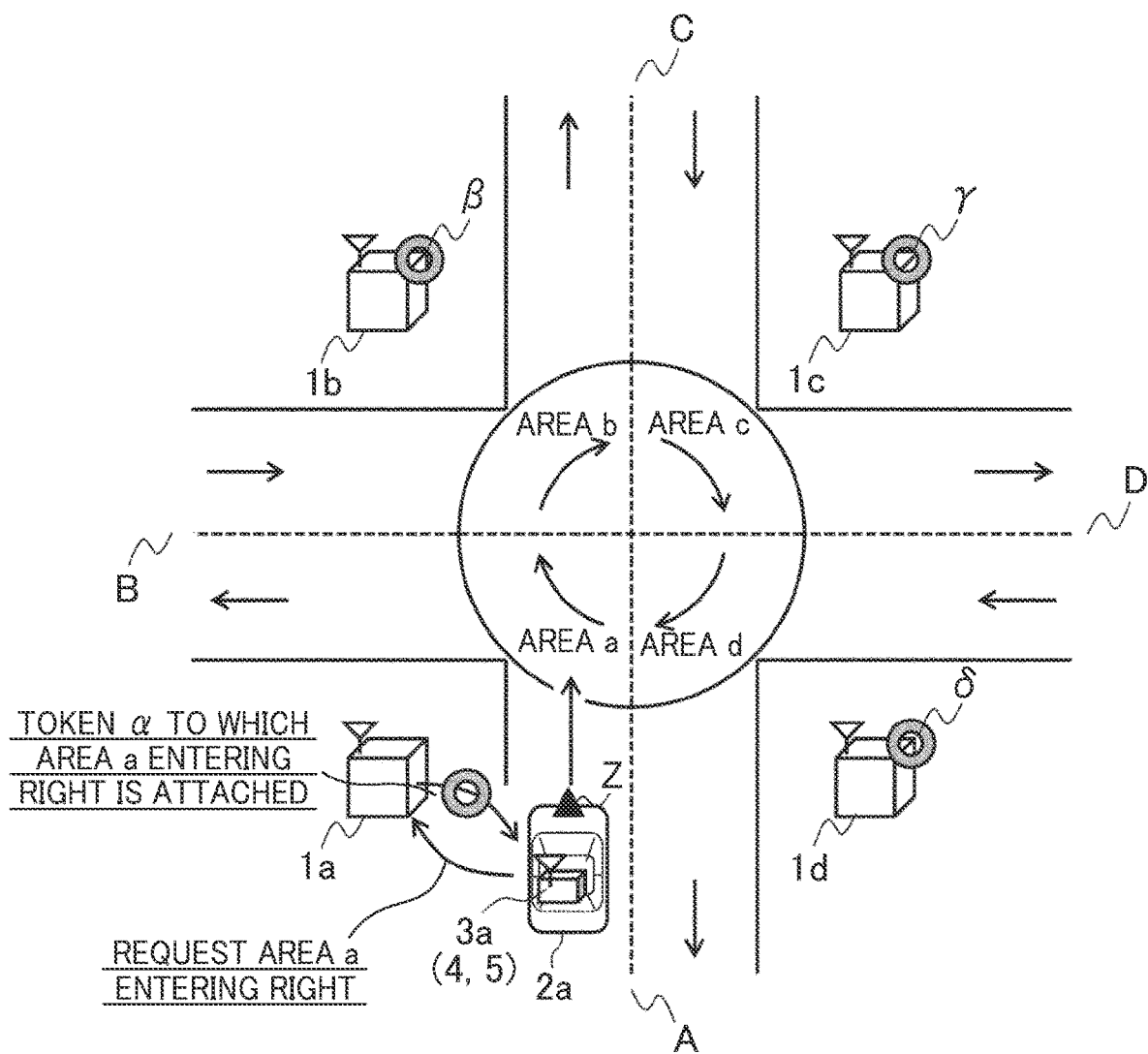

First, as illustrated in FIG. 2, the traveling controller 3a of the vehicle 2a that intends to enter the intersection requests, at a start point Z of the route from the road A to the area a, the entering right control terminal 1a to give an entering right to the area a to the entering right control terminal 1a. Then, the traveling controller 3a performs a control (including a traveling control of the vehicle or a control of an instruction to a driver or the like) so as to prevent the vehicle 2a from entering the area 2 using a boundary between the road A and the area a as a stop point, for example, until the traveling controller 3a receives the entering right to the area a.

In such a control of the stop point, with respect to means that estimates the own position of the vehicle, various methods are disclosed including a method that acquires the position using a wave from a satellite such as a global positioning system (GPS), a method that uses a laser radar and an environmental map. In this embodiment, the method for controlling the stop point is not limited. Further, also with respect to the detection of a start point of the route or the detection of connection of the areas and a range of the area, the positional information of these matters may be stored in advance or marks that indicate these information pieces may be installed on a side of the road. Further, lines, symbols, characters, numerals, and the like are written on a road surface, and these may be recognized by sensors. This embodiment is not limited to such methods.

The entering right control terminal 1a responds to an approaching request from the traveling controller 3a, and transmits the token α to which the entering right to the area a is attached to the traveling controller 3a.

Then, the traveling controller 3a releases the stop point set on the boundary between the road A and the area a at a point of time that the traveling controller 3a receives the token α to which the entering right is attached from the entering right control terminal 1a, and newly allows the vehicle 2a to enter the inside of the area a using a boundary between the area a and the area b. In this case, when a preceding vehicle or an obstacle exists in the area a, the traveling controller 3a controls the vehicle 2a so as to prevent the vehicle 2a from colliding with them. With respect to means that detects the preceding vehicle or the obstacle in the area and prevents the vehicle 2a from colliding with the preceding vehicle or the obstacle, a large number of methods that use external field sensors such as a monocular lens camera, a stereoscopic camera, a laser radar, a millimeter wave radar, and the like have already been disclosed. However, the present invention is not limited to such methods.

Figure 3:
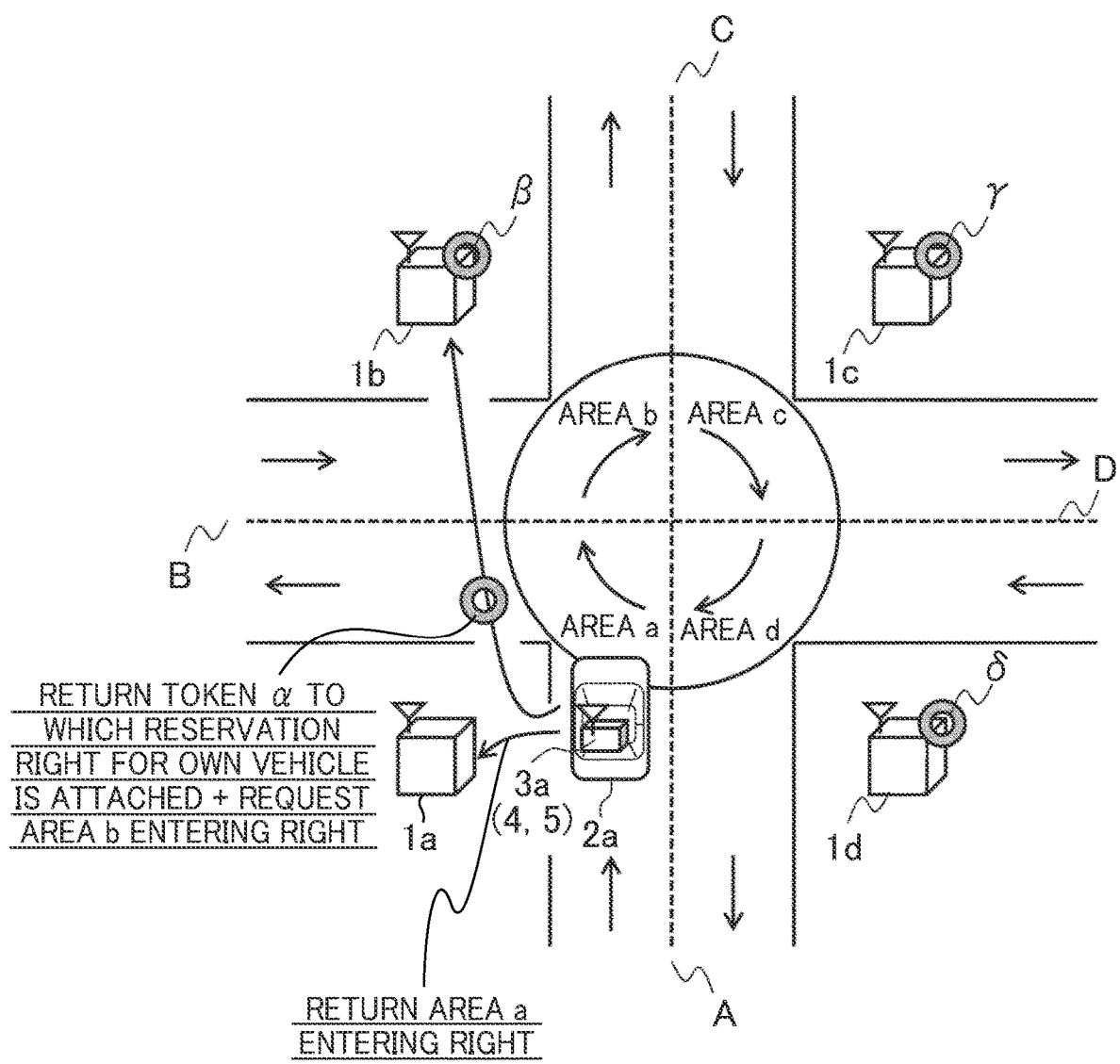

After the vehicle 2a enters the inside of the area a, as shown in FIG. 3, the traveling controller 3a returns the entering right to the area a to the entering right to the entering right control terminal 1a, and returns the token α to which the reservation right to the vehicle 2a is attached to the entering right control terminal 1b of the next area.

Further, the traveling controller 3a requests the entering right to the area b to the entering right control terminal 1b. To reduce the number of communications between the traveling controller 3a mounted on the vehicle and the entering right control terminals 1a to 1d installed on a ground side, the traveling controller 3a may also return the entering right to the area a to the entering right control terminal 1b to the area b together with the token α to which the reservation right to the vehicle 2a is attached and a request for the entering right to the area b, and the entering right control terminal 1b may return the entering right to the area a to the entering right control terminal 1a.

Figure 4:
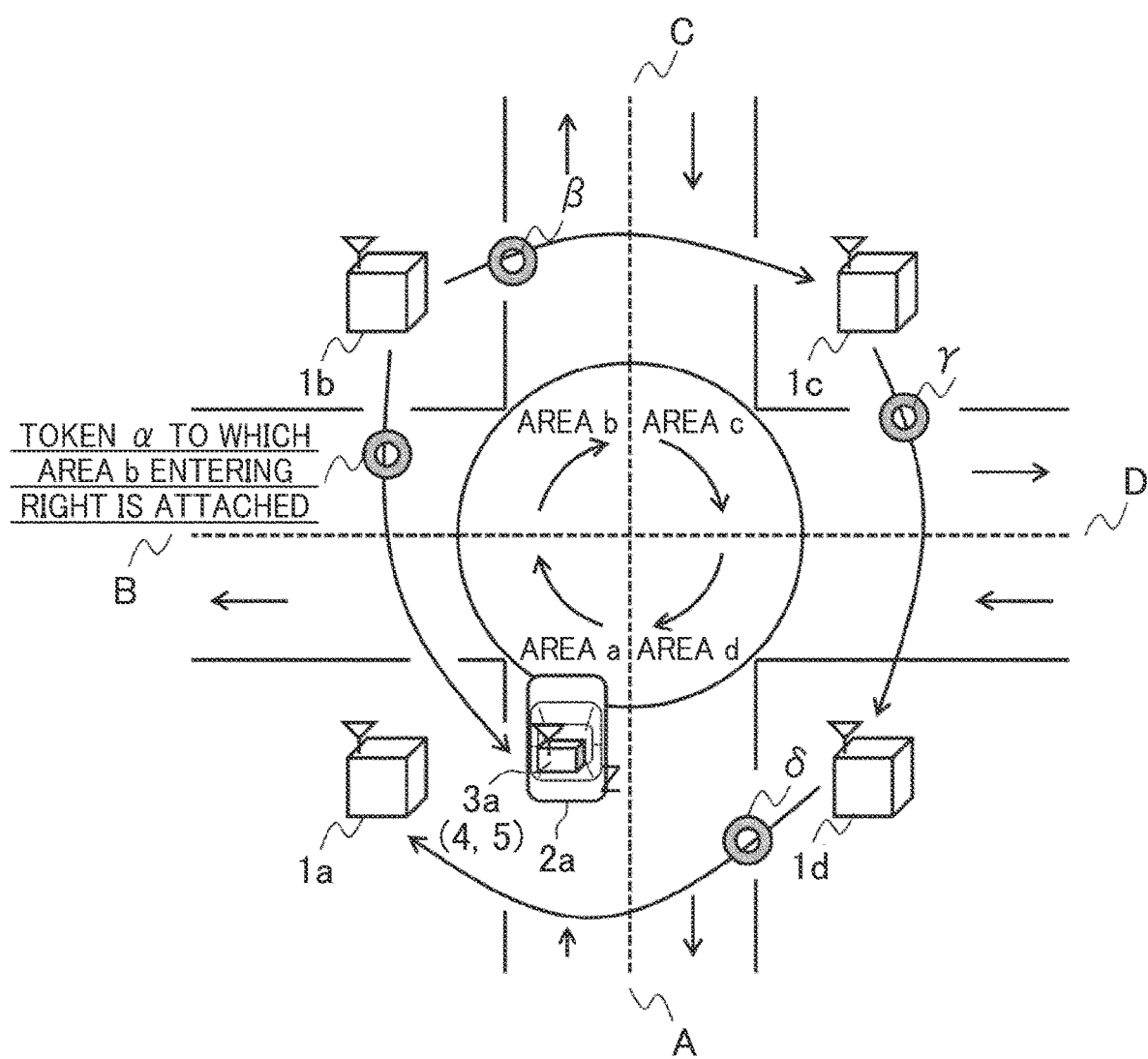
FIG. 4 is a view for describing behaviors of respective tokens after a token α is returned from the vehicle 2a to an entering right control terminal 1b.

When the entering right control terminal 1b receives the token α returned from the traveling controller 3a, as shown in FIG. 4, the entering right control terminal 1b transfers a token that the entering right control terminal 1b holds to the entering right control terminal 1c of the next area. The entering right control terminal 1c that has received the token β transfers the token γ to the entering right control terminal 1d, and the entering right control terminal 1d that receives the token γ transfers the token δ to the entering right control terminal 1a. Then, the entering right control terminal 1b, in response to a request for the entering right traveling controller 3a, transmits the reservation right attached token α to which the entering right to the area b is attached to the traveling controller 3a. At a point of time that the traveling controller 3a receives the token α to which the entering right to the area b is attached, the traveling controller 3a releases a stop point set on a boundary between the area a and the area b, and allows the vehicle 2a to the inside of the are b.

Figure 5:
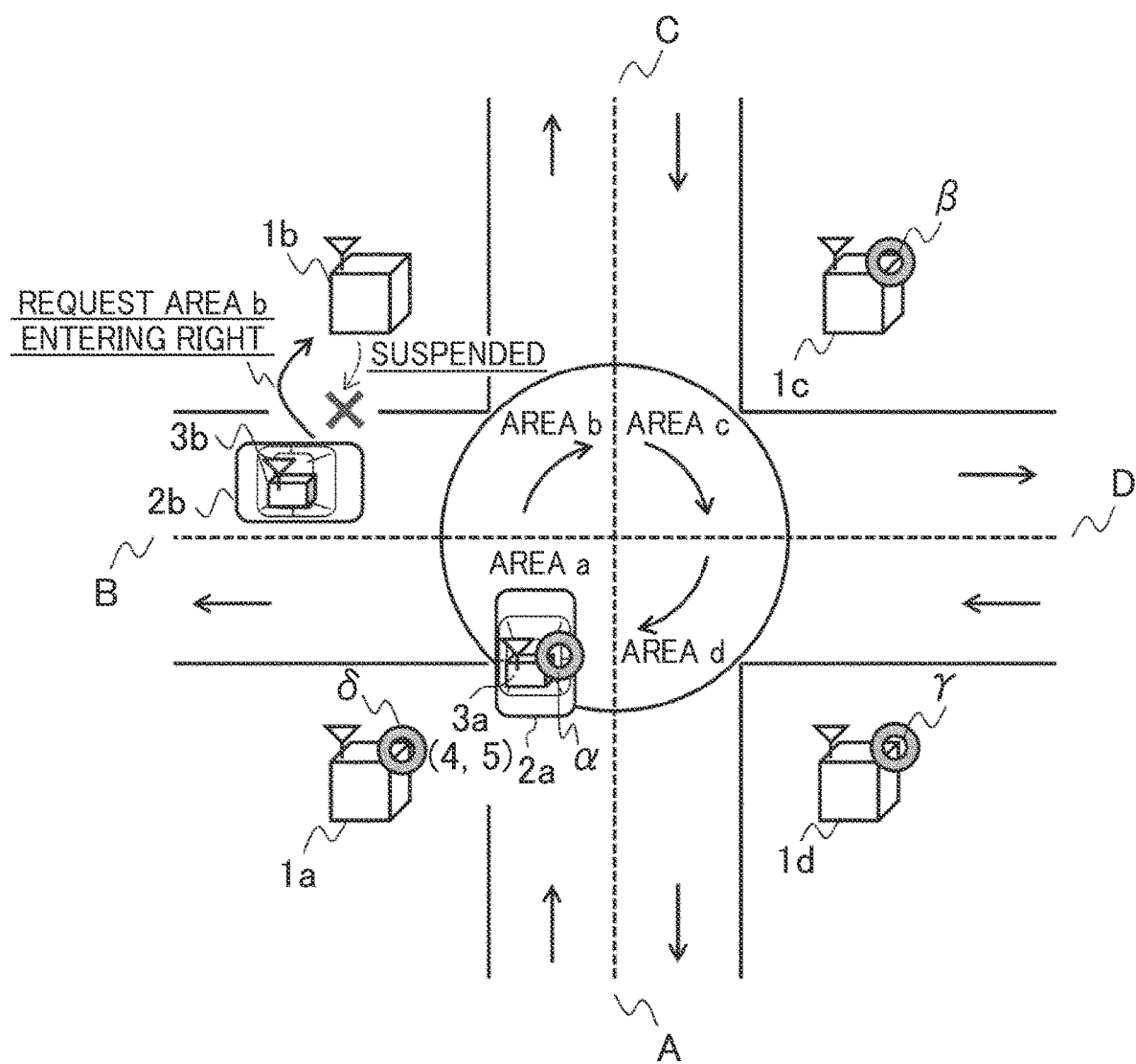
FIG. 5 is a view for describing a case where a request of an entering right to an area b by a vehicle 2b is suspended.

At this point of time, as shown in FIG. 5, it is assumed that another vehicle 2b intends to approach the intersection from the road B. However, even when the traveling controller 3b of the vehicle 2b requests the entering right to the area b to the entering right control terminal 1b, the entering right that is already given to the vehicle 2a has not been returned yet, and the entering right control terminal 1b also does not have the token. Accordingly, such a request is suspended.

Figure 6:
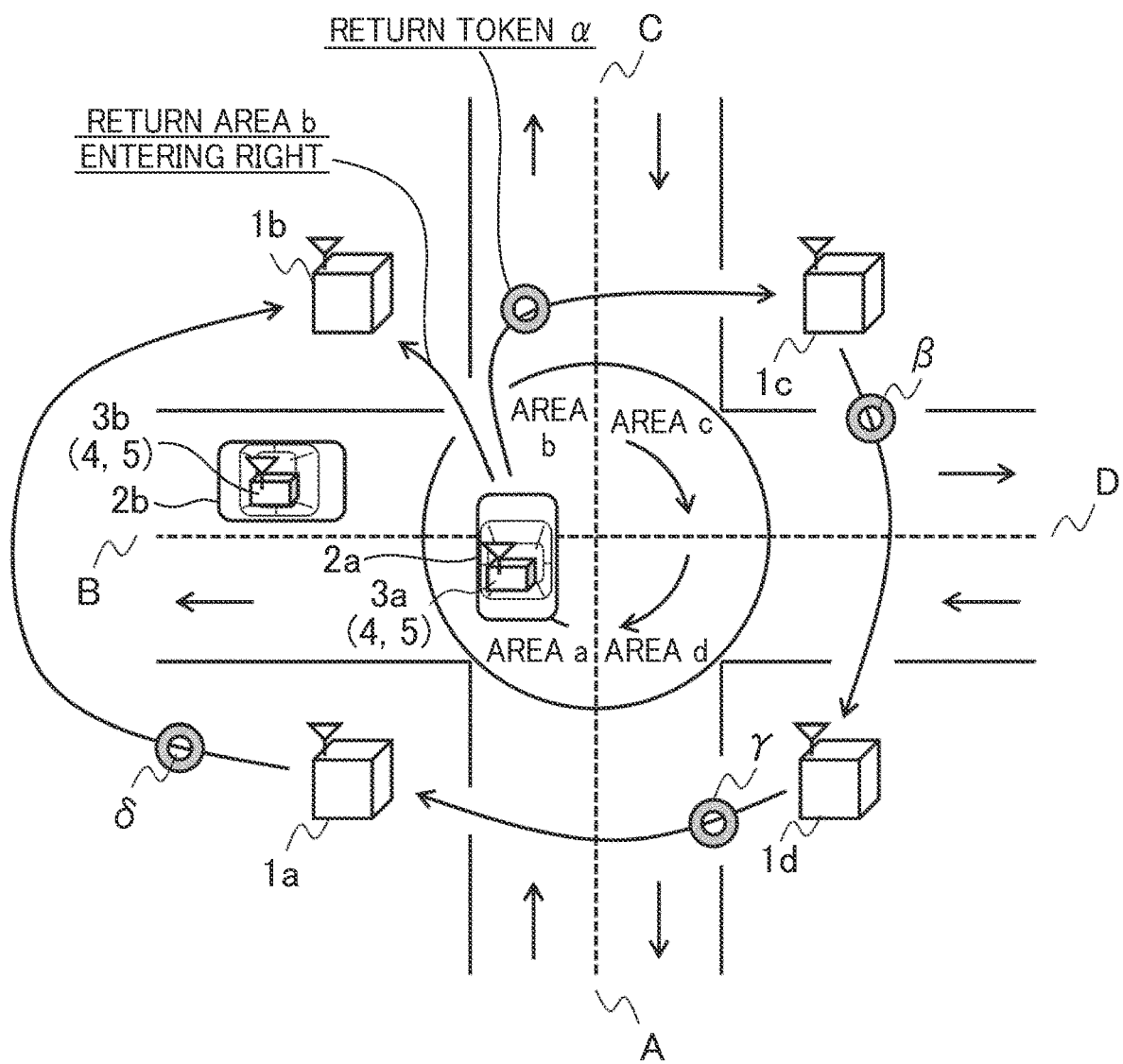
FIG. 6 is a view for describing steps after the vehicle 2a enters the area b.

After the vehicle 2a enters the inside of the area b, as shown in FIG. 6, the traveling controller 3a returns the entering right to the area b to the entering right control terminal 1b, and returns the token α to the entering right control terminal 1c of the next area. Then, the traveling controller 3a allows the vehicle 2a to exit to the road C from the area b while paying attention to a preceding vehicle and an obstacle on the road C. At this point of time, the entering right control terminal 1c transfers the token β that the entering right control terminal 1c holds to the entering right control terminal 1d, the entering right control terminal 1d transfers the token γ that the entering right control terminal 1d holds to the entering right control terminal 1a, and the entering right control terminal 1a transfers the token δ that the entering right control terminal 1a holds to the entering right control terminal 1b.

Figure 7:
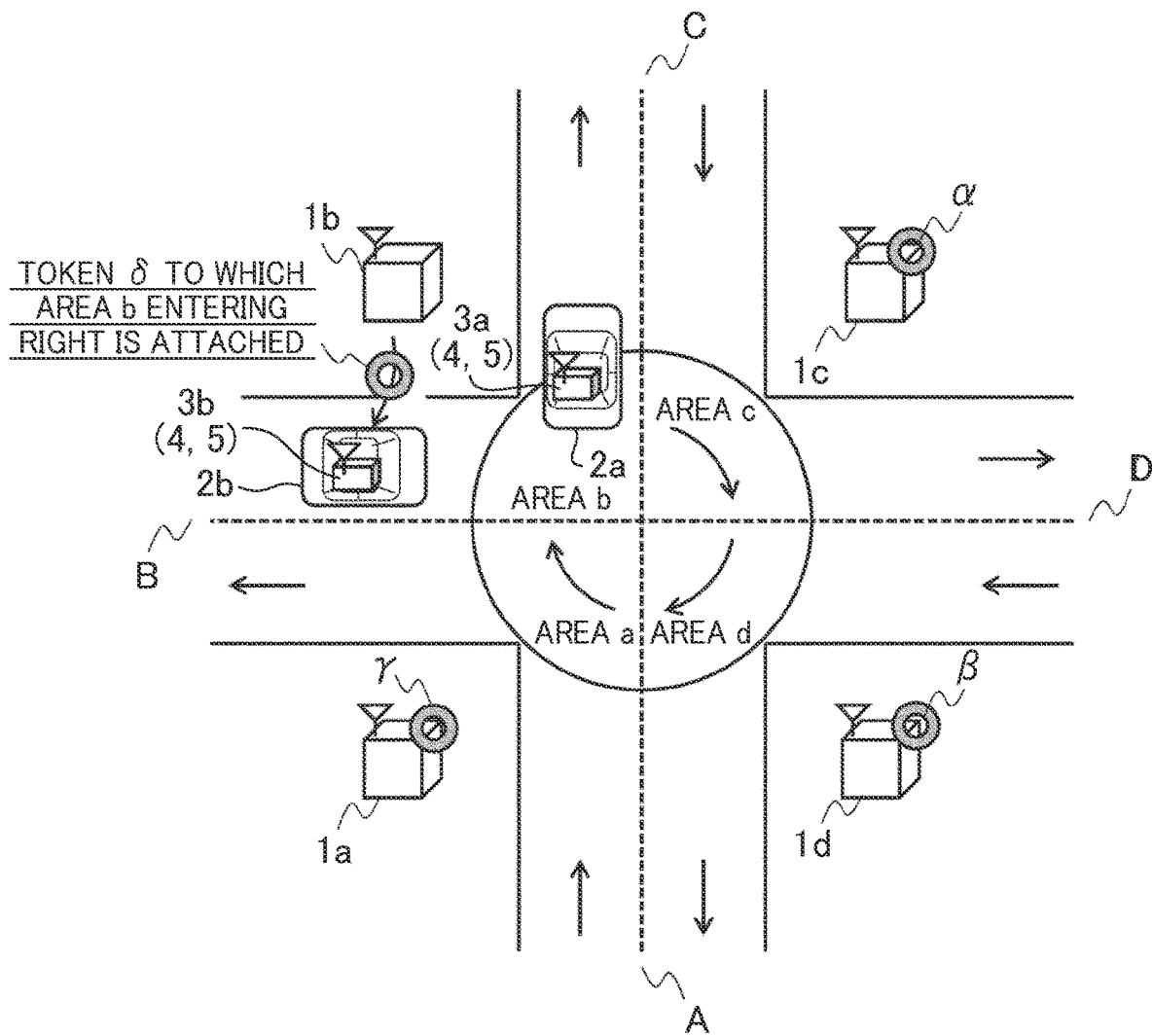
FIG. 7 is a view for describing that, after the entering right to the area b is returned from the vehicle 2a to the entering right control terminal 1b, a token δ to which the entering right to the area b is attached is transmitted to the vehicle 2b.

Then, with respect to the entering right control terminal 1b that has received the request for the entering right to the area b from the vehicle 2b, and has held the request previously, the entering right is returned to the entering right control terminal 1b from the vehicle 2a, and the token δ is transferred to the entering right control terminal 1b from the entering right control terminal 1a and hence, as shown in FIG. 7, the entering right control terminal 1b can transmit the token δ to which the entering right to the area b is attached to the traveling controller 3b.

The traveling controller 3b in mounted on the vehicle 2b. The traveling controller 3b includes a moving body communication unit 4 and a moving body control unit 5.

When the moving body communication unit 4 receives token δ to which the entering right to the area b is attached, the moving body control unit 5 performs a control such as releasing a stop point set on a boundary between the road B and the area b. As a result, the vehicle 2b is guided to enter the inside of the area b. At this point of time, in a case where there exists a preceding vehicle or an obstacle in the area b such as the vehicle 2a, the traveling controller 3b controls the vehicle 2b such that the vehicle 2b does not collide with them.

By continuously repeating the abovementioned operations, a traffic flow control of a control object road by the traffic flow control system is performed.

Manner of Operation and Advantageous Effects of First Embodiment

In the first embodiment, the device on the ground side that controls a traffic flow can smoothly control a traffic flow at an intersection by merely performing electric transaction of data of a small information amount formed of tokens and entering rights to the areas between the device on the ground side and the devices mounted on the respective vehicles traveling in the intersection.

Particularly, in the first embodiment, the entering right to other areas is automatically reserved in accordance with an advancing course with respect to the vehicle that has once approached the area. Accordingly, a traffic flow between the areas that form an obstacle (neck) of the traffic flow becomes smooth and hence, a traffic flow in and around the areas can be made smooth as a whole.

Further, in the first embodiment, the traveling controllers are in charge of actual approaching timing, approaching speeds, and the like to the intersection with respect to the respective vehicles. Accordingly, it is unnecessary for the traffic flow control system to calculate and to instruct an inter-vehicle distance and, actual approaching timings and approaching speeds at an intersection with respect to the respective vehicles. Accordingly, the traffic flow control system does not need high calculation performance.

In s case of an intersection right of side traffic, the areas are set in a left turning direction, and the vehicles are controlled in the substantially same method. The intersection that is a control object may be divided into several areas. However, tokens the number of which is equal to the number of areas are prepared and hence, the vehicles the number of which is equal to the number of areas at maximum approach the intersection. The larger the number of the areas, the larger the number of vehicles that pass the intersection per unit time becomes. However, a risk of deadlock where the vehicles cannot move is also increased. Accordingly, by taking into account the situation where the vehicles the number of which is equal to the number of areas approach the inter section, it is desirable to divide the intersection into appropriate numbers such that the vehicles do not fall in the deadlock even in such a case.

Figure 8:
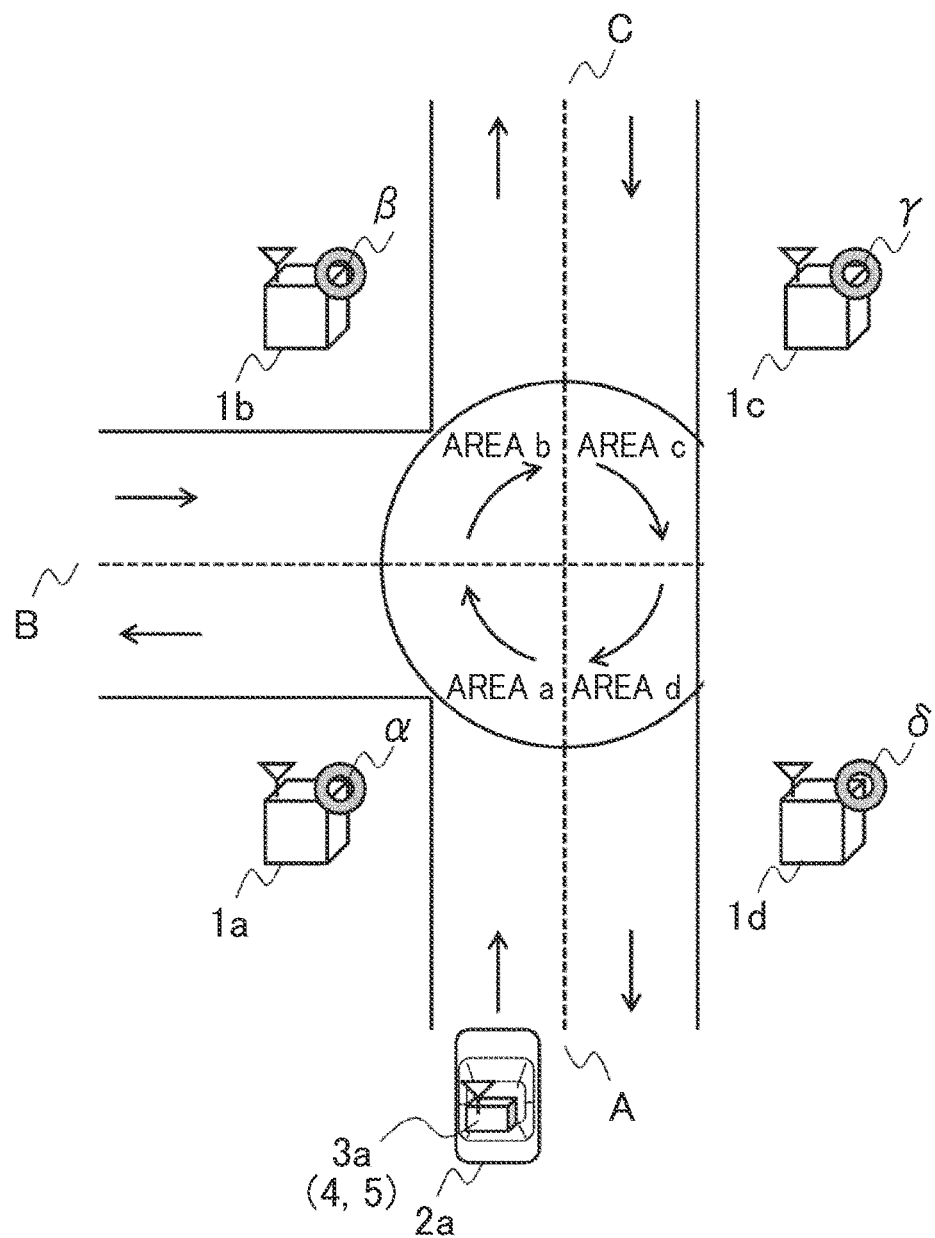
FIG. 8 is a view illustrating the configuration of a server of a traffic flow control system according to a second embodiment.

For example, as shown in FIG. 8, a traffic flow control is performed by dividing an intersection formed of a three-way junction into four areas a to d in circumferential direction about the center of the intersection. In this case, a vehicle exit pass from area c is formed of one pass to the area d, and the vehicle entrance pass to the area d is only one pass from the area c. It is needless to say that a traffic flow can be smoothly controlled using the abovementioned system. The number of the division of the area may be five or more and three or less provided that possibility that the vehicles fall in the deadlock is low and an inter-vehicle does not become larger than necessary.

Second Embodiment

Subsequently, a case where a traffic flow control system is realized by the server configuration is described.

Figure 9:
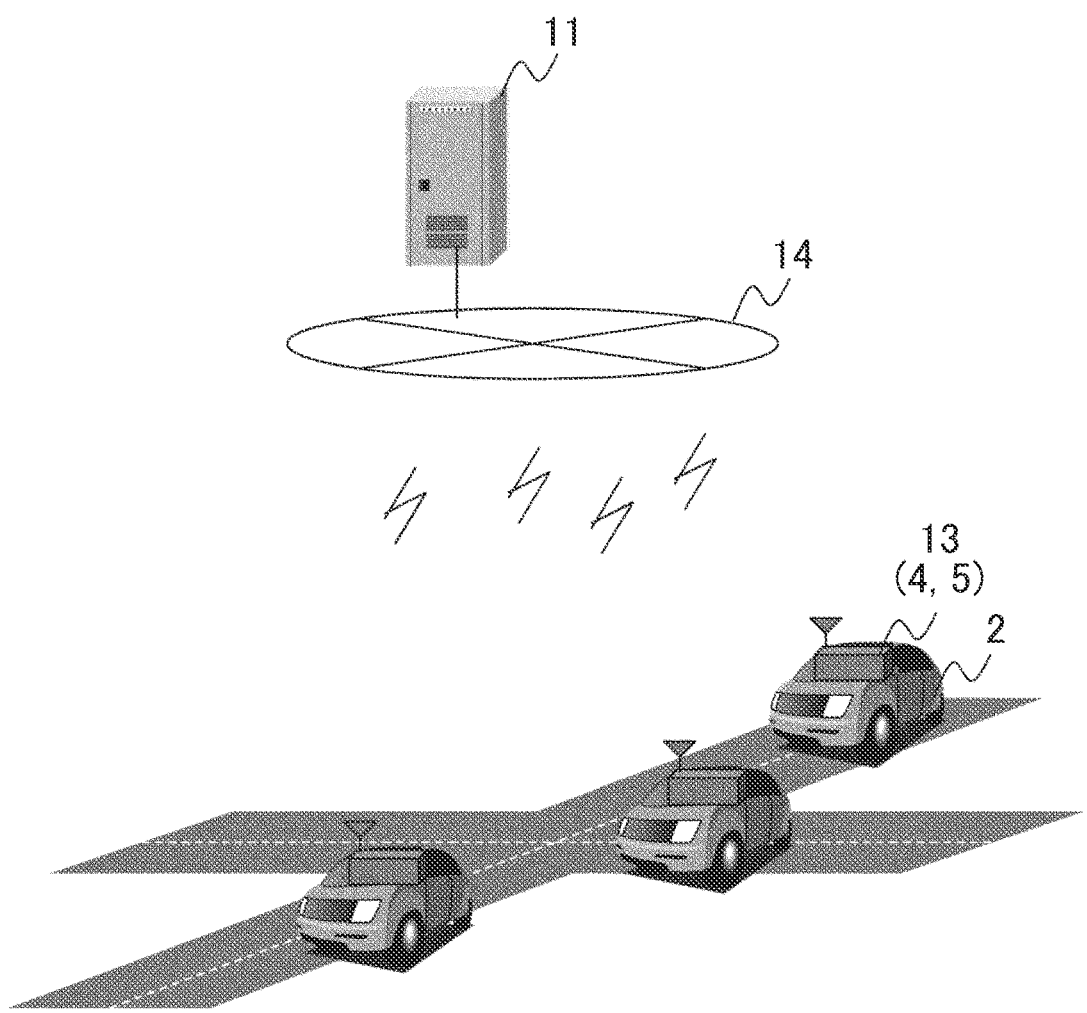
FIG. 9 is a view for describing a configuration where an intersection is a three-way junction.

FIG. 9 is a configurational view of a traffic flow control system according to the second embodiment. The traffic flow control system according to this embodiment includes an entering right control sever 11 installed on a network such as road control center, and a communication system 14 (a wireless communication network, a near distance wireless system or a combination of the wireless communication network and the near distance wireless system) on the network that enables information communication with a traveling controller 13 mounted on a vehicle 2.

Tokens are electronically transacted between the entering right control server 11 and the traveling controller 13.

The traveling controller 13 includes, in the same manner as the traveling controller 3a in the first embodiment, a moving body communication unit 4 and a moving body control unit 5.

When necessary, these entering right control server 11 and communication system 14 can be arranged spaced apart via a network. Accordingly, it is unnecessary to arrange the entering right control server 11 near a control object road (traffic path), and may be arranged at a remote place.

The entering right control server 11 is formed as a computer system that includes a central processing unit (CPU) and, memory, and the like that form hardware, for example. When the hardware executes a traffic flow control program, functions of the entering right control unit and the communication unit (or entering right control terminals 1a to 1d) are realized. A part or the entirety of the hardware may be substituted by a dedicated device, a general-use machine learning machine, a digital signal processer (DSP), a field-programmable gate array (FPGA), a graphics processing unit (GPU), a programmable logic device (PLD), or the like.

Further, a part or the entirety of the hardware may be arranged in a server on a network in a concentrated manner or in a discrete manner thus enabling the use of cloud so that a traffic flow control for a plurality of traffic paths may be performed by one traffic flow control system. In this case, a wide-range traffic flow control that includes a plurality of traffic paths can be realized. For example, for guarding very important persons (VIPs), vehicles (a group of vehicles) in which VIPs ride is speedily moved from a start point to a destination point by giving an entering right preferentially compared to other vehicles, and the entering rights to the other vehicles are rapidly restored depending on the sites thus enabling a comprehensive traffic flow control by making the entire traffic flow smooth.

The traveling controller 13 of the vehicle 2 can also be configured as a computer system that includes a central processing unit (CPU), a memory, and the like as hardware. Functions of the traveling controller can be realized when the hardware executes a traveling control program.

The second embodiment has the same operation and advantageous effects as the first embodiment already described above. Accordingly, the description that overlaps with the description in the first embodiment is omitted.

Third Embodiment

In the third embodiment, as one mode for carrying out the invention, a traffic flow control system where merging of a main road and a side road is a control object is described. (Irrespective of a road shape, a road on which a traffic amount is relatively large is referred to as a main road, and a road on which a traffic amount is relatively small is referred to as a side road. The traffic flow control system may be automatically switched corresponding to a time zone or a traffic amount.)

Figure 10:
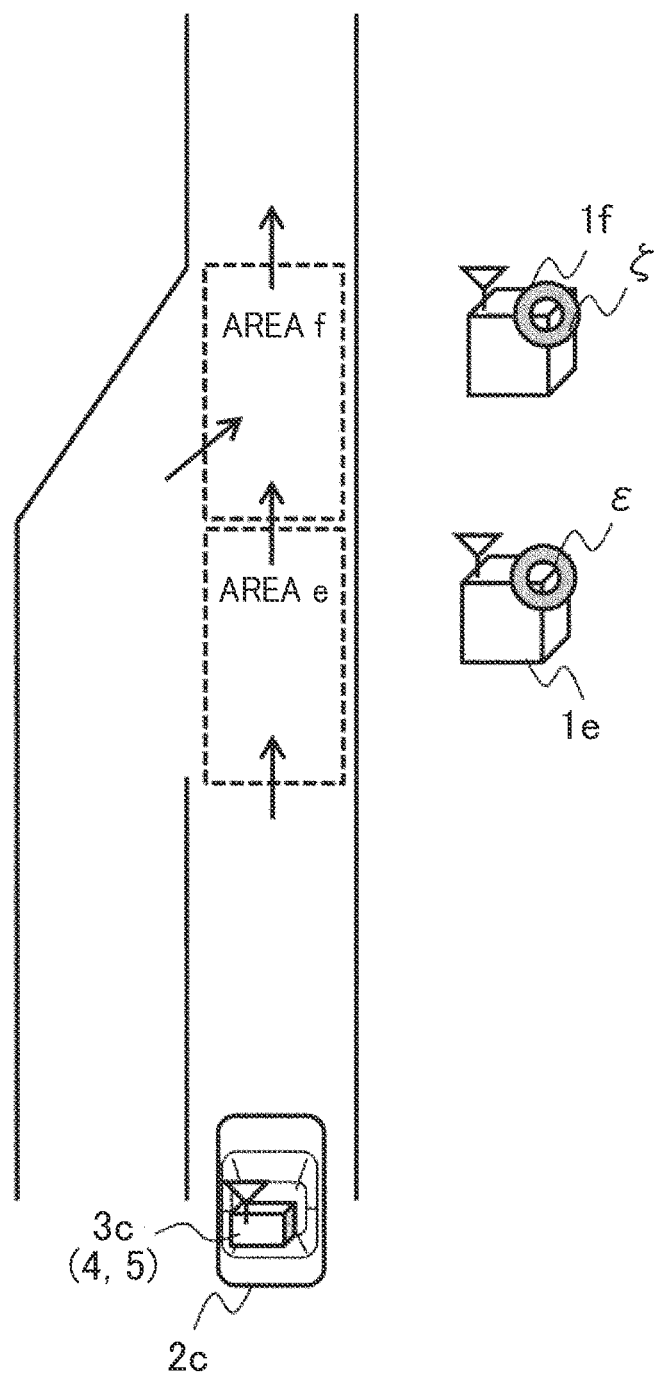
FIG. 10 is a view for describing the configuration of a third embodiment.

A traffic flow is controlled by setting an entering right to two areas, that is, a zone where the side road merges the main road and a main road zone behind the merging zone. In the third embodiment, as illustrated in FIG. 10, the zone where the side road merges the main road is referred to as a merging area f, and the main road zone behind the merging area f is referred to as a main road behind area e.

A vehicle approaching path to the main road behind area e forms one path from behind the main road, and a vehicle approaching path from the main road behind area e forms one path to the merging area f. Further, a vehicle approaching path to the merging area f is formed of two paths, that is, a path from the main road behind area e and a path from the side road. A vehicle approaching path from the merging area f is formed of one path to a from side of the main road.

An entering right of the main road behind area e and an entering right of the merging area f are controlled by entering right control terminals 1e, 1f, respectively. These entering right control terminal control two tokens as a whole. In an initial state where vehicles do not approach the merging point, as illustrated in FIG. 10, the respective entering right control terminals have one token respectively. In this embodiment, such tokens are referred to as token ε and ζ.

Functions of the respective entering right control terminal 1e, 1f and the functions of the traveling controllers of the vehicles that travel on the merging point, and the system of transaction of the tokens and entering rights between these means are substantially equal to the first embodiment.

Hereinafter, the description is made by taking up an example of the case where the vehicle 2c enters the merging point illustrated in FIG. 10 from the main road, and the vehicle 2c passes the main road behind area and the merging area. It is assumed that the traveling controller 3c is mounted on the vehicle 2c. The traveling controller 3c is a traveling controller that includes a moving body communication unit 4 and a moving body control unit 5.

Figure 11:
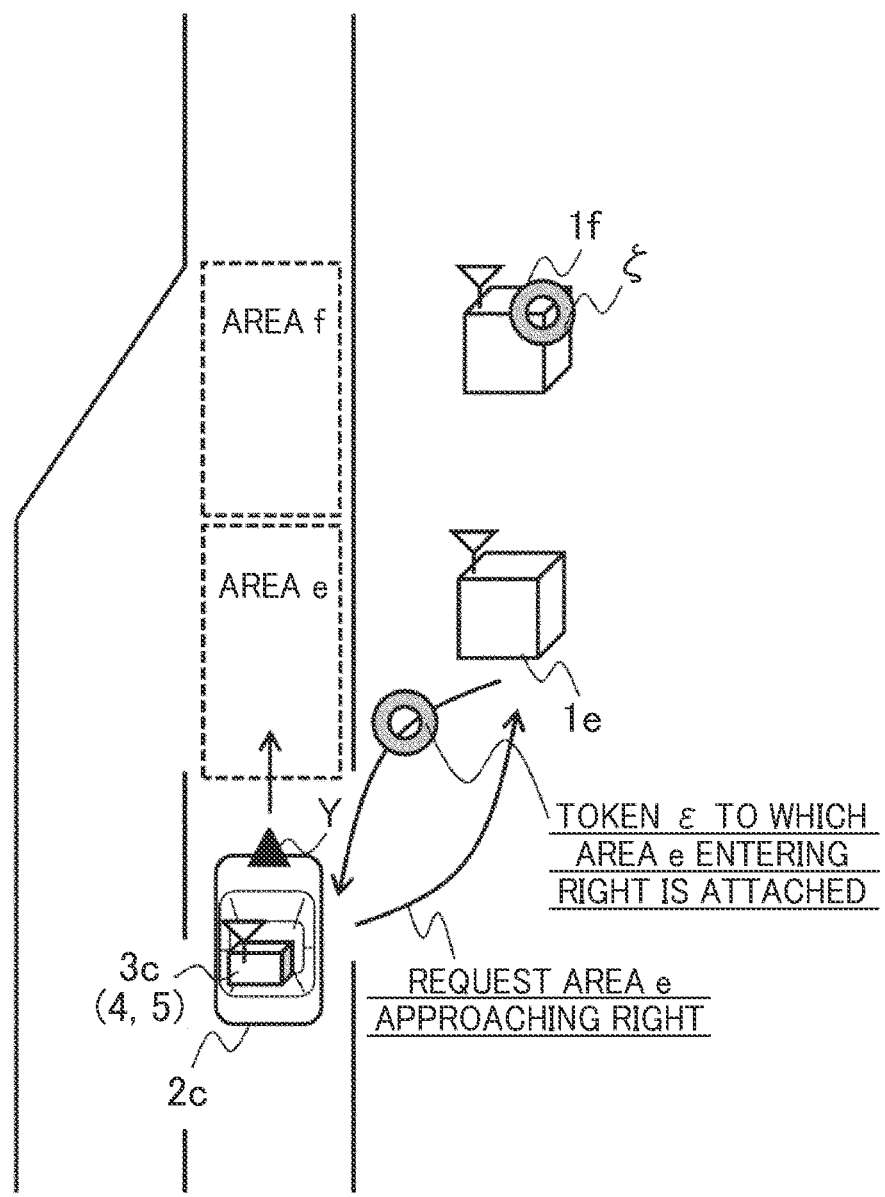
FIG. 11 is a view for describing steps when a vehicle 2c enters an area e in front of a main road.

First, as illustrated in FIG. 11, the traveling controller 3c of the vehicle 2c that intends to approach the merging point, at a start point Y of the path from the main road to the main road behind area e, requests an entering right to the main road behind area e to the entering right control terminal 1e. Then, the traveling controller 3c controls the vehicle 2c so as to prevent the vehicle 2c from entering the main road behind area e using a behind boundary of the main road behind area e as a stop point until the traveling controller 3c receives an entering right to the main road behind area e.

The entering right control terminal 1e responds to the entering right request from the traveling controller 3c, and transmits a token c to which an entering right to the main road behind area e is attached to the traveling controller 3c.

The traveling controller 3c releases the stop point set on the behind boundary of the main road behind area e at a point of time that the traveling controller 3c receives the token ε to which the entering right to the main road behind area e is attached from the entering right control terminal 1e, and allows the vehicle 2c to approach the inside of the main road behind area e newly using a boundary between the main road behind area e and the merging area f as the stop point.

In this case, when a preceding vehicle or an obstacle exists in the main road behind area e, the traveling controller 3c controls the vehicle 2c so as to prevent the vehicle 2c from colliding with them.

Figure 12:
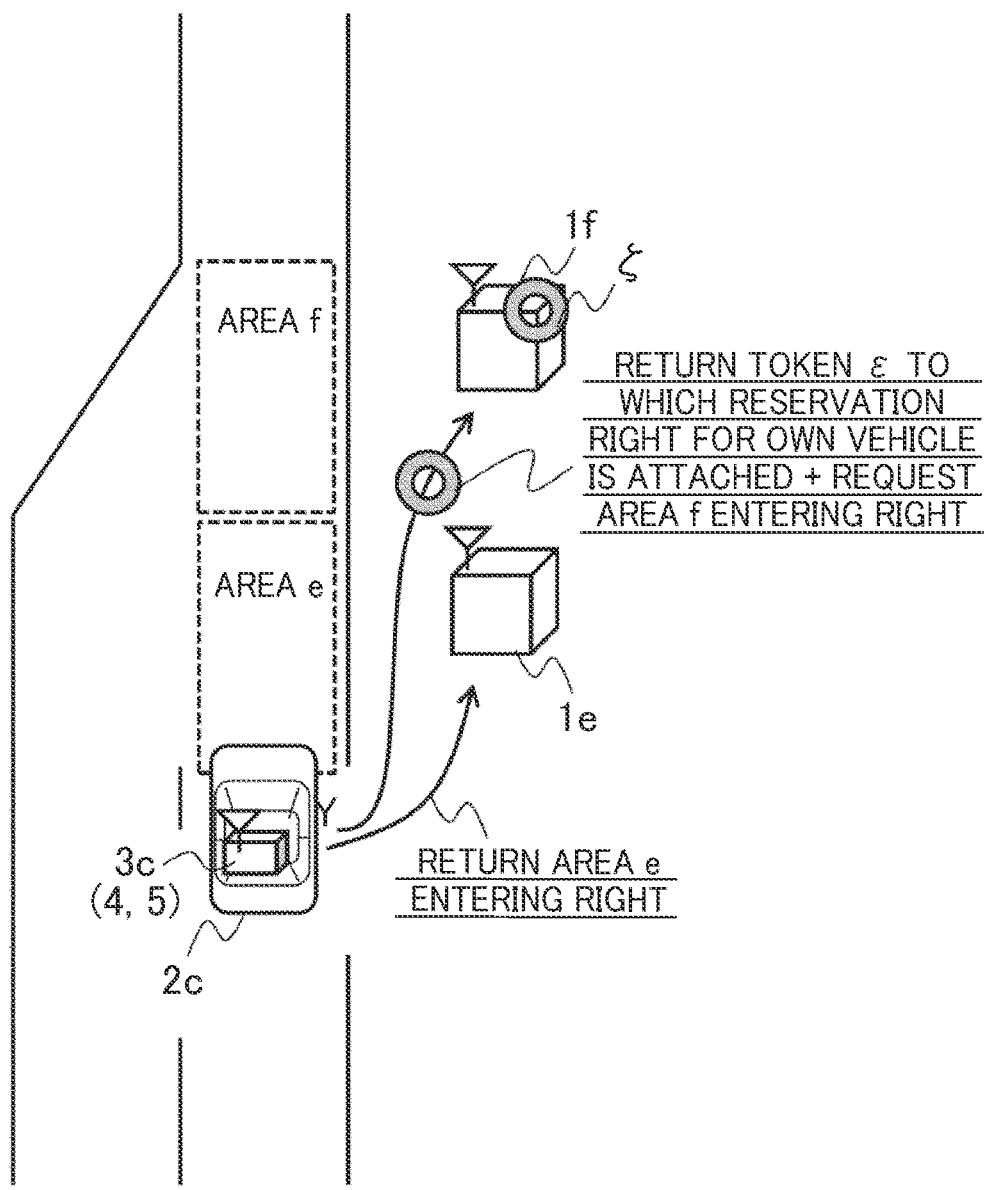
FIG. 12 is a view for describing steps after the vehicle 2c enters the area e in front of the main road.

After the vehicle 2c enters the inside of the main road behind area e, as illustrated in FIG. 12, the traveling controller 3c returns the entering right to the main road behind area e to the entering right control terminal 1e, and returns the token ε to which the reservation right to the vehicle 2c is attached to the entering right control terminal 1f of the next area. Further, the traveling controller 3c request the entering right to the merging area f to the entering right control terminal 1f.

To reduce the number of communications between the traveling controller mounted on the vehicle and the entering right control unit installed on a ground side, the traveling controller 3c may also return the entering right to the main road behind area e together with a token ε to which the reservation right to the vehicle 2c is attached and a request for the entering right to the merging area f to the entering right control terminal 1f of the area, and the entering right control terminal 1f may return the entering right to the main road behind area e to the entering right control terminal 1e.

Figure 13:
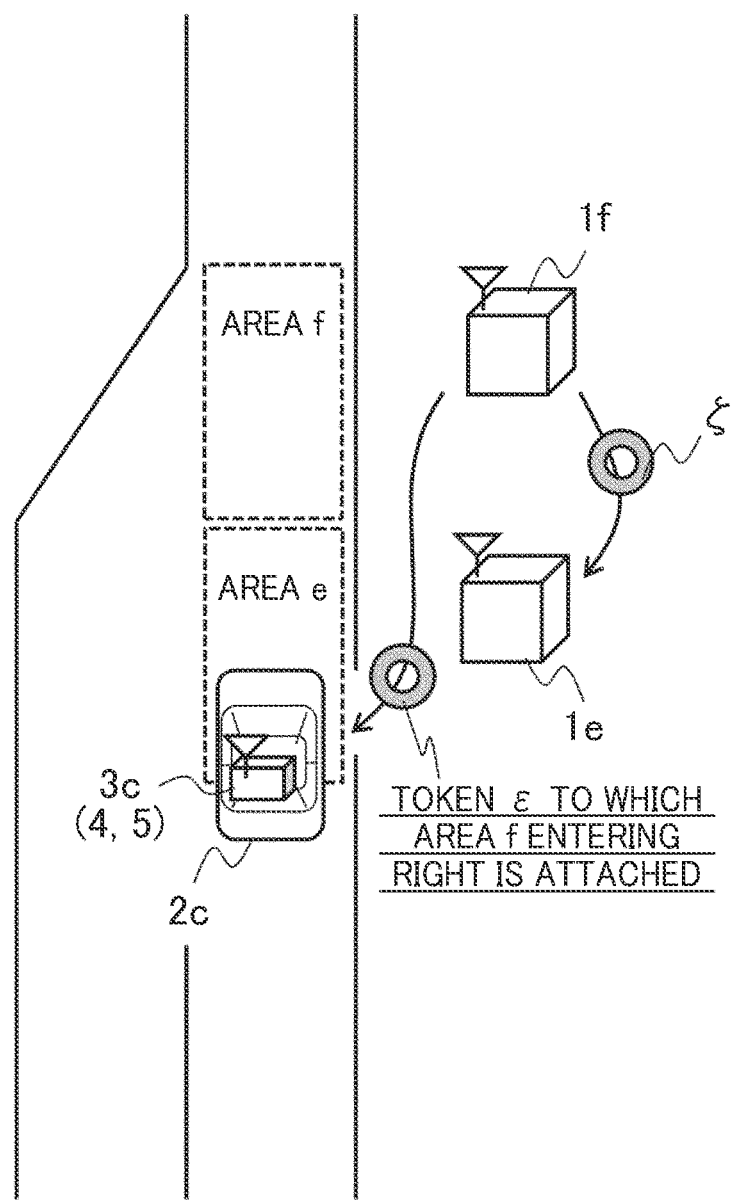
FIG. 13 is a view for describing behaviors of respective tokens after a token ε is returned from the vehicle 2c to an entering right control terminal 1f.

When the entering right control terminal 1f receives the token ε returned from the traveling controller 3c, as illustrated in FIG. 13, the entering right control terminal 1f transfers a token ζ that the entering right control terminal 1f holds to the other entering right control terminal 1e. Then, the entering right control terminal 1f responds to an entering right request from the traveling controller 3c, and transmits the token ε to which the entering right to the merging area f is attached to the traveling controller 3c. The traveling controller 3c releases the stop point set on the boundary between the main road behind area e and the merging area f at the point of time that the traveling controller 3c receives the token ε to which the entering right to the merging area f is attached, and allows the vehicle 2c to approach the inside of the merging area f.

Figure 14:
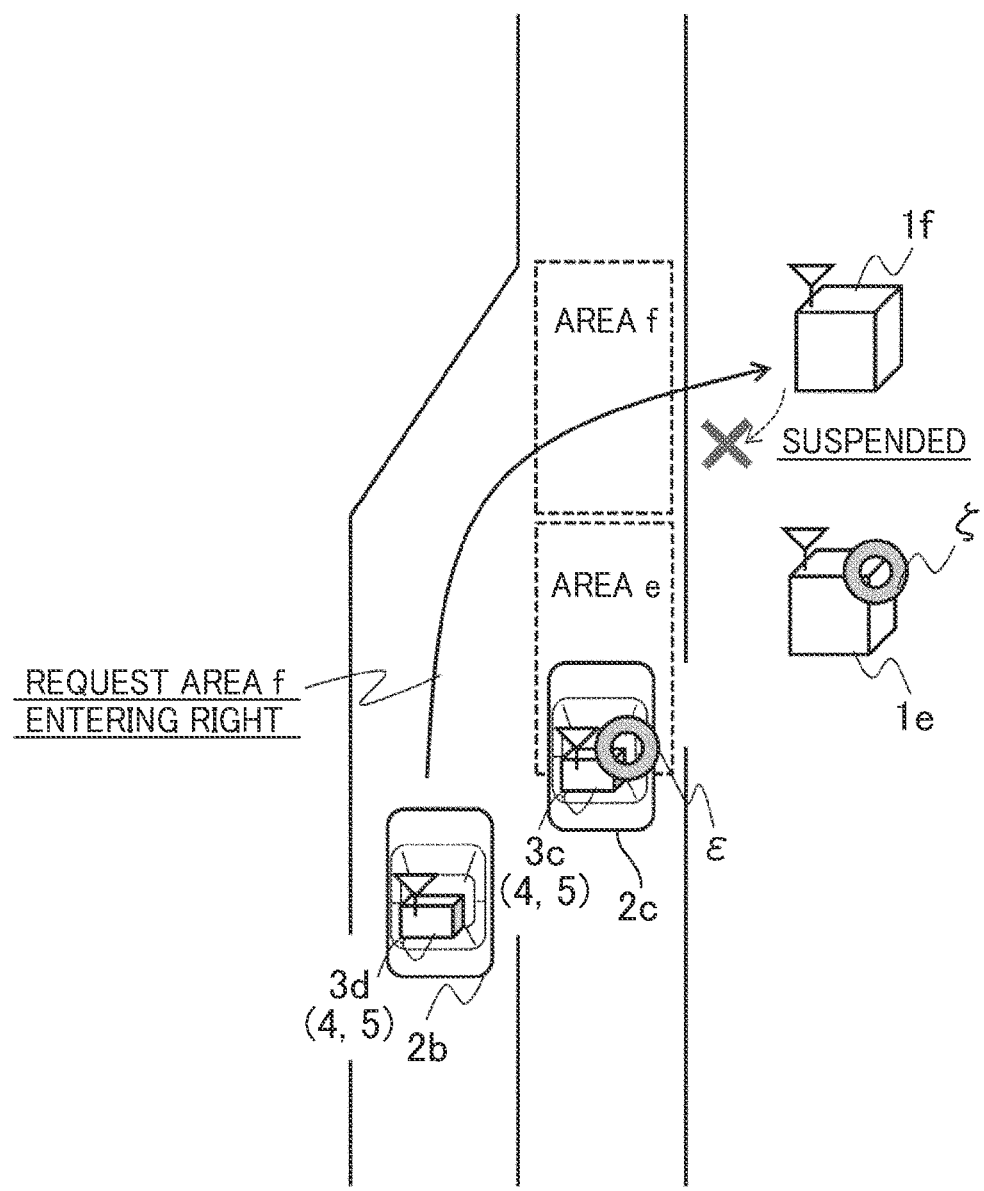
FIG. 14 is a view for describing a case where a request of an entering right to a merging area f by a vehicle 2d is suspended.

At this point of time, as illustrated in FIG. 14, it is assumed that another vehicle 2d intends to approach to the merging point from the side road. However, even when a traveling controller 3d of the vehicle 2d requests an entering right to the merging area f to the entering right control terminal 1f, the entering right that has already been given to the vehicle 2c has not been returned yet, and the traveling controller 3d does not possess a token. Accordingly, the request is suspended.

Figure 15:
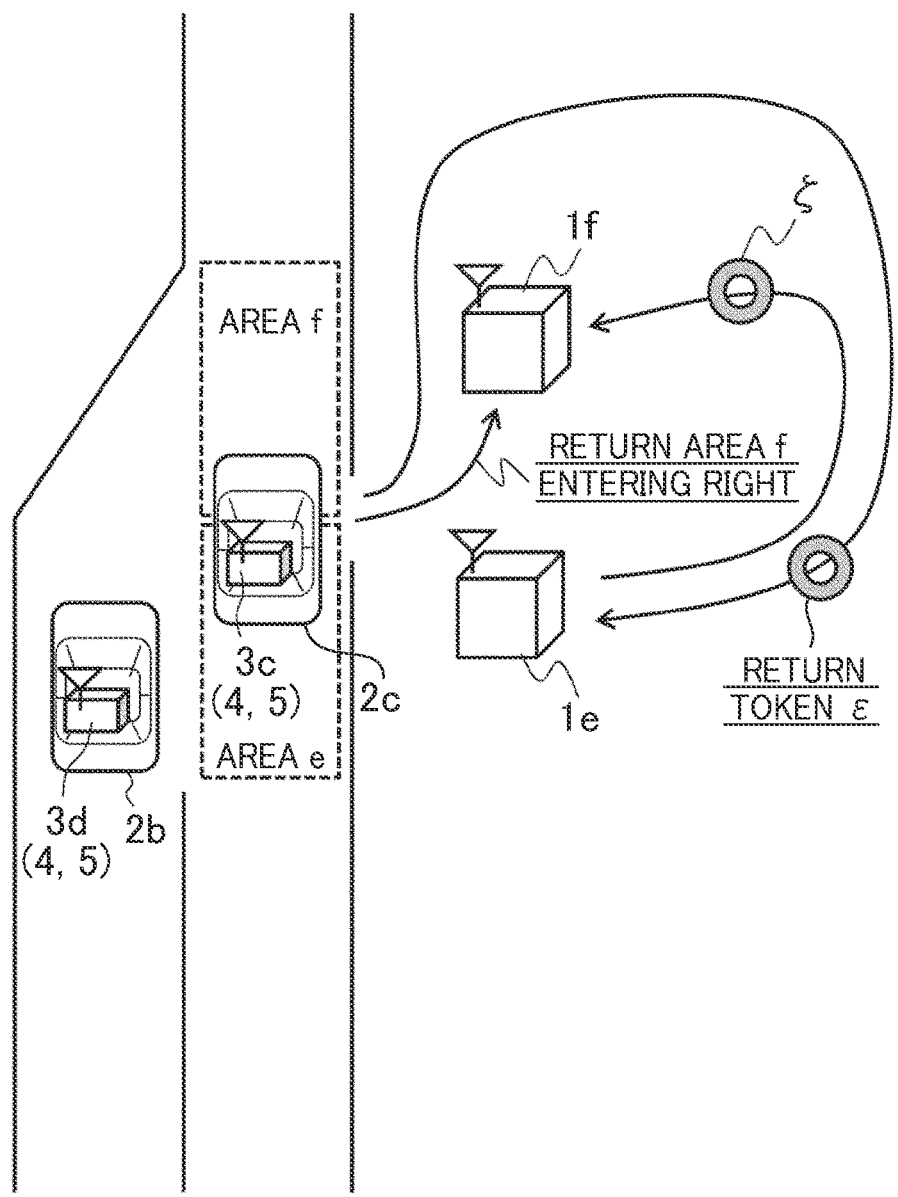
FIG. 15 is a view for describing steps after a vehicle 2c enters a merging area f.

After the vehicle 2c enters the inside of the merging area f, as illustrated in FIG. 15, the traveling controller 3c returns the entering right to the merging area f to the entering right control terminal 1f, and returns the token ε to the other entering right control terminal 1e. Then, the traveling controller 3c allows the vehicle 2c to go out to a front side of the main road from the merging area f while paying attention to a preceding vehicle and an obstacle on a front side of the main road. At this point of time, the entering right control terminal 1e transfers the token ζ that the entering right control terminal 1e possesses to the entering right control terminal 1f.

Figure 16:
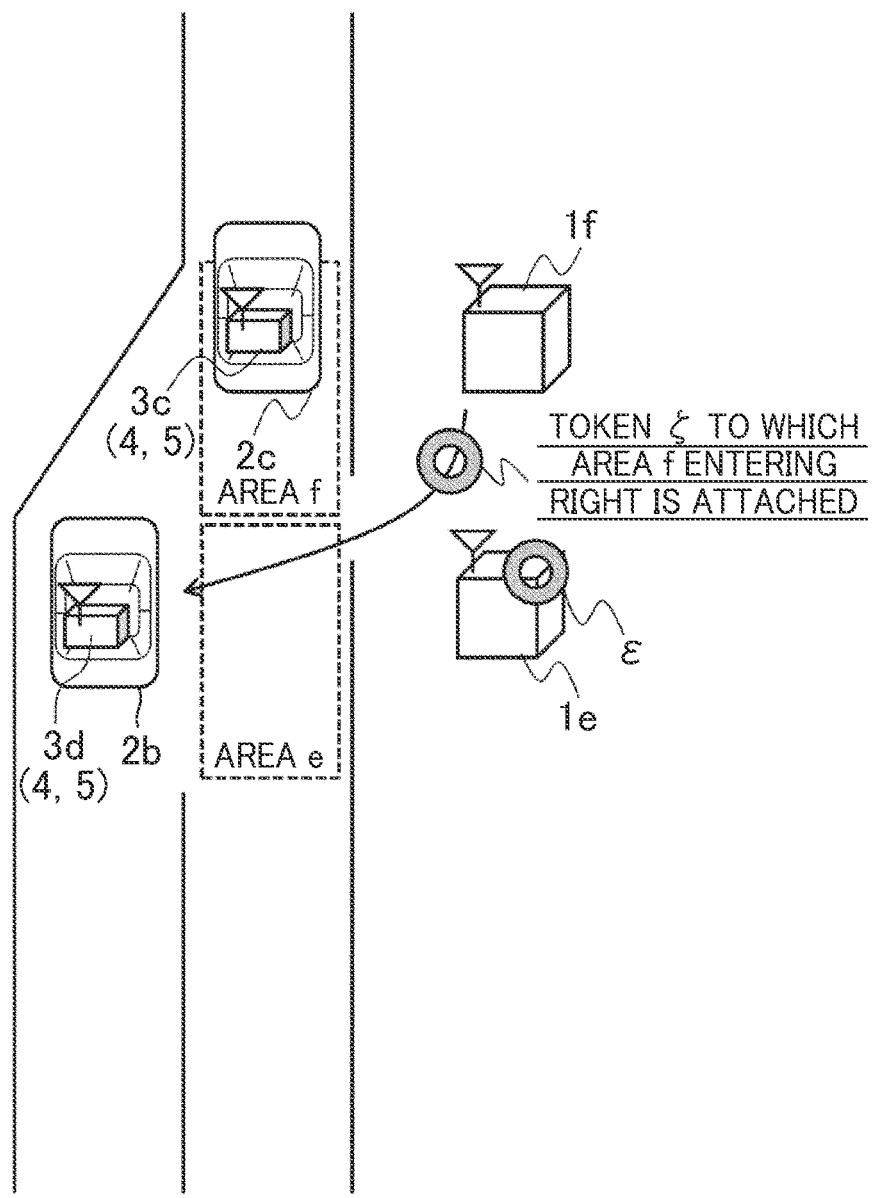
FIG. 16 is a view for describing that, after the entering right to the merging area f is returned from the vehicle 2c to the entering right control terminal 1f, a token ζ to which an entering right f to a merging area f is attached is transmitted to the vehicle 2d.

Then, the entering right control terminal 1f that has suspended the request of the entering right to the merging area f from the vehicle 2d previously transmits the token ζ to which the entering right to the merging area f is attached to the traveling controller 3d as illustrated in FIG. 16 since the entering right is returned from the vehicle 2c and the token ζ is transferred from the entering right control terminal 1e.

The traveling controller 3d is mounted on the vehicle 2d. The traveling controller 3d includes a mobbing body communication unit 4 and a moving body control unit 5.

When the moving body communication unit 4 receives the token ζ to which the entering right to the merging area f is attached, the moving body control unit 5 performs a control of the stop point set on the boundary between the side road and the merging area f, and the like. As a result, the vehicle 2d is guided to approach to the inside of the merging area f. At this point of time, in a case where a preceding vehicle or an obstacle exists inside the merging area f, the traveling controller 3d controls the vehicle 2d so as to prevent the vehicle 2d from colliding with them.

The traffic flow control system according to this embodiment may also be realized by the configuration substantially equal to the server configuration illustrated in FIG. 9.

In this manner, according to the traffic flow control system, the traffic flow control method, and the traffic flow control program of the present embodiments, the device on a ground side that controls a traffic flow can smoothly control a traffic flow at a merging point between a main road and a side road by merely performing electronic transaction of data of a small information amount formed of tokens and entering rights between the device on the ground side and the devices mounted on the respective vehicles that travel on a merging point between the main road and the side road. Further, it is unnecessary for the traffic flow control system to calculate and instruct actual approaching timings, approaching speeds, and the like to the merging point between the main road and the side road with respect to the respective vehicles and hence, it is unnecessary for the traffic flow control system to possess high-performance sensor function and calculation performance.

The reservation right of the entering right to the merging area f is automatically given to the vehicle that enters the main road behind area e. Accordingly, priority is given to a traffic flow in a zone of the main road to a traffic flow on the side road. Accordingly, a traffic flow control that enables a smooth traffic flow on the main road side is realized.

Figure 17:
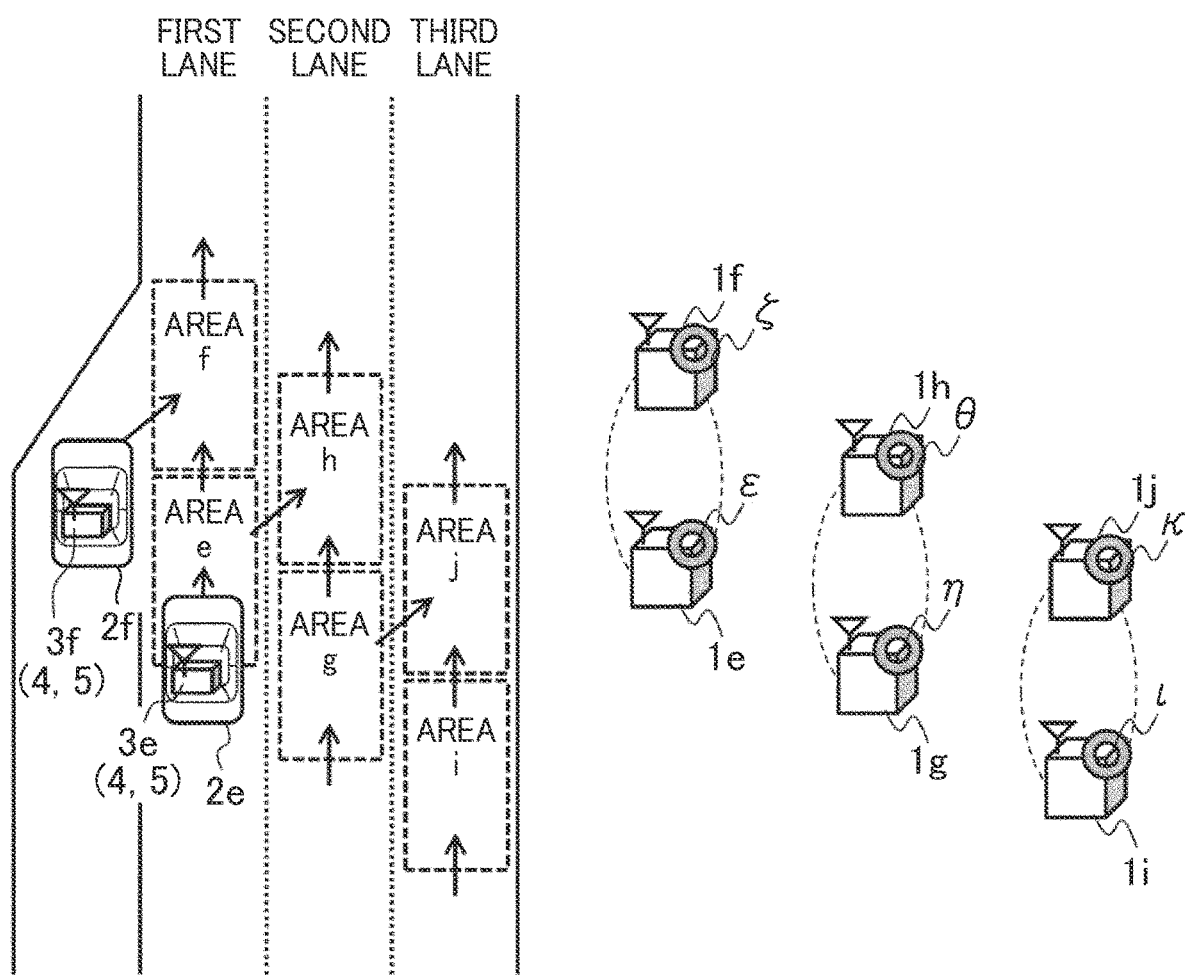
FIG. 17 is a view for describing the configuration of a traffic flow control system in a case where a main road is formed of a plurality of lanes.

In accordance with the abovementioned method, in a case where the main road is formed of a plurality of lanes, a traffic flow can be controlled by providing merging points to the respective lanes from the left lane as illustrated in FIG. 17 and hence, a traffic flow control can be performed more smoothly.

For example, a merging area h where the first lane merges with the second lane from the main road behind area e and an area g disposed behind the merging area h are provided to the second lane, and a merging area j where the second lane merges with the third lane from the area g of the second lane and an area i disposed behind the merging area j are provided to the third lane. Entering rights to the respective areas are controlled by the respective entering right control units, and the entering right control units of the respective lanes cooperatively control tokens the number of which is equal to the number of areas. That is, in the second lane, the entering right control terminals 1g, 1h control the entering rights to the areas g, h, respectively, and cooperatively control the tokens η, θ. In the third lane, the entering right control terminals 1i, 1j controls the entering rights to the areas i, j, and cooperatively controls the tokens ι, κ.

In accordance with the abovementioned method, in a case where a request for an entering right to the merging area is suspended and a vehicle has to decrease a vehicle speed, as an option, the vehicle may perform a lane change to the right lane. For example, in a case where the vehicle 2f intends to merge from the side road so that a request of the vehicle 2e for an entering right to the merging area f is suspended, the vehicle can request the entering right to the merging area h to the entering right control terminal 1h based on a vehicle entering path from the main road behind area e to the merging area h. In this case, when the vehicle can receive the token η or θ to which the entering right to the merging area h is attached from the entering right control terminal 1h, the vehicle can perform a lane change to the second lane.

The third embodiment has the same operation and the advantageous effects as the first embodiment and the second embodiment described above. Accordingly, the description that overlaps with the description in the first embodiment and the second embodiment is omitted.

The description of the embodiment is made on a premise of left-side traffic. However, the same goes for the right-side traffic.

The present invention is not limited to the abovementioned embodiments, and includes various modifications. For example, the abovementioned embodiments are described in detail for facilitating the understanding of the present invention, and it is not always necessary that the traffic flow control system includes all constituent elements.

Some constituent elements in one embodiment may be replaced with constituent elements of other embodiments, or constituent elements of other embodiments may be added to constituent elements of one embodiment.

Some constituent elements of respective embodiments may be added to, deleted from, or replaced with other constituent elements.

For example, the traffic flow control system, the traffic flow control method, and the traffic flow control program described above are applicable to not only a road traffic flow control but also a traffic flow control of construction machines and conveyance vehicles that travel in construction sites, civil engineering working sites, and mines, and conveyance vehicles and cargo handling vehicles that travel in factories, warehouses, hospitals, stations, buildings, and the like.

In the mode for carrying out the invention, to facilitate the understanding of the present invention, the present invention is limited to the case where the traffic flow control system is used on land. However, the present invention is not limited to such a case. For example, the present invention is not limited to the traffic flow control system on land described in the mode for carrying out the invention, and is also applicable to the traffic flow control system on traffic ways such as sea, a river, a water way, a channel, an underground way, an underwater way, a railway, a high way, an airway, a walkway, and outer space. In such a case, the moving body is a moving body that travels on the traffic way and hence, the moving body corresponds to moving bodies in general including, for example, an automobile, a railroad vehicle, a ship, an airplane, a flying object, a drone, a submarine, a motorcycle, a bicycle, a self-traveling body, a robot, a pedestrian, a spaceship, and a rocket. Further, the traveling controller corresponds to devices in general that can directly or indirectly control movement of a moving body such as an automatic driving device of a moving body, an automatic braking mechanism, a traveling assist device, a navigation device for guiding a route, and an alarm indication device relating to moving timing and moving courses.

The traveling controller is not limited to a mode where the traveling controller is mounted on each moving body. For example, a traveling controller may be arranged on a cloud (network), and the traveling controller may perform a control (for example, automatic driving, automatic braking, traveling assist, route guiding, alarm indication, and the like) on a moving body via a network, a communication medium, or the like.

Further, in the embodiment, a token attached with a reservation right is set on and is transmitted to a moving body side. However, the present invention is not limited to such a case. For example, in a case where an exit path of a moving body that enters an area is limited to a specific next area, an entering right control unit may automatically handle a token returned from the moving body that enters the area to the next area as a token attached with a reservation right.

In the embodiment, an entering right is given to a moving body in a state where the entering right is added to the token. However, the present invention is not limited to such a case. An entering right may be given to a moving body in a state where a token and the entering right are attached. For example, an appropriate time lag may be provided so as to transmit by a different packet after making tokens and entering right correspond to each other.

LIST OF REFERENCE SIGNS 1a, 1b, 1c, 1d, 1e, 1f, 1g, 1h, 1i, 1j: entering right control terminal
2a, 2b, 2c, 2d, 2e, 2f: vehicle
3a, 3b, 3c, 3d, 3e, 3f, 13: traveling controller
4: moving body communication unit
5: moving body control unit
11: entering right control server
14: communication system
A, B, C, D: road
α, β, γ, δ, ε, ζ, η, θ, ι, κ: token

The invention claimed is:

1. A traffic flow control system configured to control a traffic flow of a traffic path by communicating with a traveling controller of a moving body that travels on the traveling path, the traffic flow control system comprising:
a plurality of entering right control units configured to control an entering right for each of a plurality of areas, the plurality of entering right control units configured to each control a token and configured to guide entering of the moving body into the plurality of areas by attaching the entering right to the token and by giving the token to the traveling controller; and
a communication unit configured to perform communication of the entering right and each token, respectively, between the communication unit and the traveling controller,
wherein a first entering right control unit is configured to transmit a first token and a first entering right to a first moving body to enter a first area and receive a return of the first entering right from the first moving body after the first moving body enters the first area by exercising the first entering right into the first area, and
wherein a second entering right control unit is configured to receive the first token from the first moving body and a reservation right for a second area to which the moving body enters next.

2. The traffic flow control system according to claim 1, wherein the second entering right control unit is configured to give the second entering right of the second area that is reserved by the first token with the reservation right to the moving body.

3. The traffic flow control system according to claim 1, in a case where the second entering right control terminal is in position of a second token upon receiving the first token, the second token is transferred to a third entering right control terminal.

4. The traffic flow control system according to claim 1, comprising:
an entering right control server configured to be implemented with functions of the entering right control server and connected to a network; and
a communication system connected to the network and configured to be implemented with a function of the communication unit.

5. The traffic flow control system according to claim 1, wherein the traveling path is an intersection, and
the plurality of areas are defined by dividing the intersection in a circumferential direction about an intersecting center of the intersection.

6. The traffic flow control system according to claim 1, wherein the traveling path is a merging flow path where a side path merges with a main road, and
the plurality of areas are defined by dividing the merging flow path is into at least a merging area where the side road and the main road merge, and a main road behind area which is behind the merging area on the main road.

7. A traffic flow control method of controlling a traffic flow of a traffic path by communicating with a traveling controller of a moving body that travels on the traveling path, the traffic flow control method comprising the steps of:
controlling, by a plurality of entering right control units, an entering right for each of a plurality of areas, the plurality of entering right control units configured to each control a token and configured to guide entering of the moving body into the plurality of areas by attaching the entering right to the token and by giving the token to the traveling controller;
performing communication, by a communication unit, of the entering right and each token, respectively, between the communication unit and the traveling controller;
transmitting, by a first entering right control unit, a first token and a first entering right to a first moving body to enter a first area and receiving a return of the first entering right from the first moving body after the first moving body enters the first area by exercising the first entering right into the first area; and
receiving, by a second entering right control unit, the first token from the first moving body and a reservation right for a second area to which the moving body enters next.

8. A traffic control device configured to control moving of a moving body that travels on a traffic path by performing communication with a traffic flow control system that is configured to control a traffic flow of the traveling path, the traffic control device comprising:
a movable body communication unit configured to perform communication with the traffic flow communication control system; and
a moving body control unit configured to perform a control of the moving body that intends to enter an area of a plurality of areas formed by dividing the traffic path so as to prevent the moving body from entering the area until an entering right to the area is given to the moving body from the traffic flow control system,
wherein the moving body moving body control unit is configured to:
request a first entering right control unit for a first entering right to a first area,
receive a first token and the first entering right from the first entering right control unit,
return the first entering right to the first entering right control unit,
transmit, to a second entering right control unit, the first token and a reservation right for a second area to which the moving body enters next.

\* \* \* \* \*